G. H. THOMAS.
Carriage Axle.
No. 48,111.  Patented June 6, 1865.
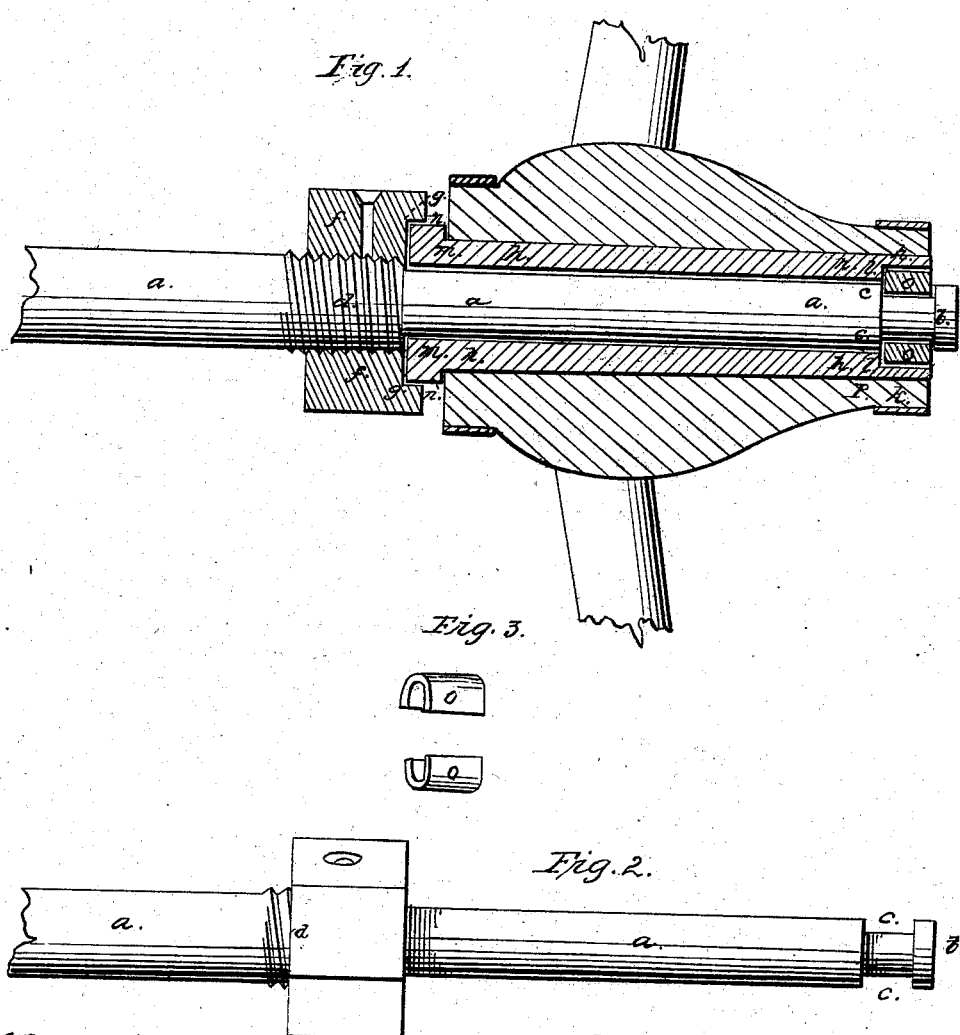

UNITED STATES PATENT OFFICE.

GEO. HAYWARD THOMAS, OF NEW YORK, N. Y.

IMPROVEMENT IN CARRIAGE-AXLES.

Specification forming part of Letters Patent No. 48,111, dated June 6, 1865.

*To all whom it may concern:*

Be it known that I, GEORGE HAYWARD THOMAS, of the city, county, and State of New York, have invented a new and useful Improvement in Axles for Carriages; and I do hereby declare that the following is a full, clear, and exact description thereof, which will enable others skilled in the art to make and use the same, reference being had to the accompanying drawings, forming part of this specification.

The present invention has for its principal objects the perfect securing of the wheels of carriages upon their axles and the prevention of their escape therefrom when in use; and it consists in forming at or near the outer end of the axle-shaft, and extending entirely around the same, a square or any other proper shaped groove, in which groove, after the wheel has been placed upon the axle, a similar-shaped collar or ring, made in two parts and of a little greater thickness than the depth of the groove, is fitted, and sprung against the inner projecting edge of which ring a proper-shaped shoulder of the pot or bush of the wheel is brought to a bearing by means of a screw-nut placed and moving upon the main body of the axle and acting against the inner surface of the wheel. The wheel is thus held on its axle by and between the shoulder formed by the collar and the screw-nut, making a perfect and permanent attachment of the wheel thereon, and one which it is evident is not liable and cannot possibly be sufficiently loosened from the use of the carriage to cause the wheel to finally work or play off of its axle, for the reason that a permanent and fixed shoulder is always presented to resist the centrifugal force exerted by the wheel in its revolutions in lieu of a screw-nut, as has heretofore generally been the case.

In the accompanying plate of drawings my improvement is represented, Figure 1 being a central section through the axle, showing a wheel inserted thereon; Fig. 2, a view of the axle with the wheel removed, and Fig. 3 a detail view of the collar.

$a$ $a$ in the drawings represent an axle of a wagon, carriage, &c., made of iron, or any other suitable metallic substance, and having at or near its outer end, $b$, a square-shaped groove, $c$, extending entirely around its periphery, and upon its inner portion, or the main body of the axle, a screw-thread, $d$, on and over which fits a screw-nut, $f$, having formed upon and in its outer surface and extending entirely around the opening of the same a shoulder, $g$, of a square or other proper shape.

$h$ represents the pot or bush of the carriage-wheel, and is to be securely attached therein in the usual manner, and is equal, or nearly so, in its internal diameter to the diameter of the axle-shaft $a$, so that when placed thereon it can freely move and turn upon the same. At the outer end, $k$, of the pot or bush $h$ a shoulder, $l$, is formed, extending a short distance upon the inner surface of the same, and at its inner end, $m$, is a raised projecting rim, $n$, extending entirely around its exterior periphery, of corresponding form to the shoulder $g$ of the nut $f$.

$o$ $o$ represent a collar or ring made in two parts or sections and of proper shape to fit over and upon the groove $c$ of the axle when placed therein, but of a little greater thickness than the depth of the said groove, making a shoulder, $p$, around the axle $a$.

The wheel is first placed upon the axle and pushed along upon the same a sufficient distance to leave its groove $c$ open, so that the collar can be inserted therein, when the wheel is then pulled toward the front end of the axle, its shoulder $l$ coming to a bearing against the collar, where it is held by simply bringing the nut to bear against the inner surface of the wheel. The shoulder $l$, in the bush of the wheel, I intend to extend to such a distance therein that when it is brought to bear against the collar, as described, the bush shall entirely cover, or nearly so, the same, as seen in Fig. 1, and thus prevent all liability of its being sprung out of its groove.

From the above description it is evident that by my improved mode of fastening a wheel upon its axle the wheel can never possibly become detached therefrom, no matter how much the carriage may be used, for the reason that its tendency to work off of the axle is resisted by a permanent and fixed bearing in lieu of a screw-nut, which has heretofore usually been employed, the advantages of which are evident.

To remove the wheel it is only necessary to partially unscrew the nut and then push the wheel back on its axle a sufficient distance to allow the collar to be removed, when the wheel has only to be pulled off in the ordinary manner.

The collar may be made in more than two pieces and of any size and shape other than that herein described and represented.

What I claim as new, and desire to secure by Letters Patent, is—

The mode herein described of securing a wheel upon its axle, the same consisting in the use at the outer end of the axle of a detachable or movable collar or ring, in connection with a nut, the two being arranged together and operating substantially in the manner herein above set forth.

GEORGE H. THOMAS.

Witnesses:
ALBERT W. BROWN,
M. M. LIVINGSTON.